US008577645B2

(12) United States Patent
Turin et al.

(10) Patent No.: US 8,577,645 B2
(45) Date of Patent: Nov. 5, 2013

(54) AIR/FUEL MIXTURE IMBALANCE DIAGNOSTIC SYSTEMS AND METHODS

(75) Inventors: Raymond Claude Turin, Grosse Pointe Park, MI (US); Andrew P Bagnasco, Plymouth, MI (US); Steven Ward Majors, Howell, MI (US); Ian J. MacEwen, White Lake, MI (US)

(73) Assignee: GM Global Technology Operations LLC

( * ) Notice: Subject to any disclaimer, the term of this patent is extended or adjusted under 35 U.S.C. 154(b) by 640 days.

(21) Appl. No.: 12/326,463

(22) Filed: Dec. 2, 2008

(65) Prior Publication Data

US 2010/0082297 A1  Apr. 1, 2010

Related U.S. Application Data

(60) Provisional application No. 61/101,710, filed on Oct. 1, 2008.

(51) Int. Cl.
*G06F 11/00* (2006.01)
*G01L 23/00* (2006.01)

(52) U.S. Cl.
USPC ............... 702/183; 73/114.72; 73/114.73

(58) Field of Classification Search
USPC ............... 702/183; 73/114.72, 114.73
See application file for complete search history.

(56) References Cited

U.S. PATENT DOCUMENTS

| 5,535,135 | A * | 7/1996 | Bush et al. ............ 702/24 |
| 6,314,952 | B1 * | 11/2001 | Turin et al. ............ 123/673 |
| 6,382,198 | B1 * | 5/2002 | Smith et al. ............ 123/673 |
| 6,510,329 | B2 * | 1/2003 | Heckel ............ 600/310 |
| 7,043,899 | B2 * | 5/2006 | Wang et al. ............ 60/277 |
| 7,152,594 | B2 | 12/2006 | Anilovich et al. |
| 7,248,960 | B2 * | 7/2007 | Ikemoto et al. ............ 701/114 |
| 7,802,563 | B2 * | 9/2010 | Behr et al. ............ 123/692 |
| 8,042,211 | B2 * | 10/2011 | Stansel et al. ............ 8/159 |
| 2009/0084082 | A1 * | 4/2009 | Martin et al. ............ 60/39.281 |

OTHER PUBLICATIONS

Steven W. Smith, "The Scientist and Engineer's Guide to Digital Signal Processing", copyright © 1997-1998, http://www.dspguide.com/ch2/2.htm.*
Jeff L. Kainz et al., "Individual Cylinder Fuel Control with a Switching Oxygen Sensor", SAE Technical Paper Series, 1999-01-0546, SAE International Congress and Exposition, Detroit, Michigan, Mar. 1-4, 1999.*

* cited by examiner

*Primary Examiner* — Mohamed Charioui
*Assistant Examiner* — Alexander Satanovsky

(57) ABSTRACT

An air/fuel imbalance (AFIM) diagnostic system comprises a first module, an imbalance determination module, and an imbalance diagnostic module. The first module outputs imbalance data samples based on an oxygen signal provided by an oxygen sensor measuring oxygen in exhaust expelled from cylinders of a cylinder bank. The imbalance determination module determines an AFIM value based on the imbalance data samples. The imbalance diagnostic module selectively diagnoses an AFIM in the cylinder bank based on the AFIM value.

14 Claims, 4 Drawing Sheets

AIR/FUEL MIXTURE IMBALANCE DIAGNOSTIC SYSTEMS AND METHODS

CROSS-REFERENCE TO RELATED APPLICATIONS

This application claims the benefit of U.S. Provisional Application No. 61/101,710, filed on Oct. 1, 2008. The disclosure of the above application is incorporated herein by reference.

FIELD

The present disclosure relates to internal combustion engines and more particularly to air/fuel mixture diagnostic systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines combust a mixture of air and fuel to produce drive torque and propel a vehicle. More specifically, air is drawn into an engine through a throttle valve. Fuel provided by one or more fuel injectors mixes with the air to form the air/fuel mixture. The air/fuel mixture is combusted within one or more cylinders of the engine to produce torque. An engine control module (ECM) controls torque output by the engine.

Exhaust gas resulting from combustion of the air/fuel mixture is expelled from the engine to an exhaust system. One or more oxygen sensors measure oxygen in the exhaust gas and output signals accordingly. The ECM selectively adjusts the air and/or fuel of the air/fuel mixture based on the output of the oxygen sensors. For example, the ECM may adjust the air/fuel mixture to produce a stoichiometric air/fuel mixture (e.g., 14.7:1).

Adjustments of the air/fuel mixture also vary the components of the resulting exhaust gas. For example, combustion of a lean air/fuel mixture (e.g., greater than 14.7:1) produces exhaust gas that is hotter than exhaust gas produced when a stoichiometric air/fuel mixture is combusted. The exhaust gas resulting from combustion of the lean air/fuel mixture may also include a greater concentration of nitrogen oxides (NOx) than exhaust gas produced by combustion of the stoichiometric mixture. A rich air/fuel mixture (e.g., less than 14.7:1) may produce cooler exhaust gas having a greater concentration of carbon oxides than the exhaust gas produced by combustion of the stoichiometric mixture.

SUMMARY

An air/fuel imbalance (AFIM) diagnostic system comprises a first module, an imbalance determination module, and an imbalance diagnostic module. The first module outputs imbalance data samples based on an oxygen signal provided by an oxygen sensor measuring oxygen in exhaust expelled from cylinders of a cylinder bank. The imbalance determination module determines an AFIM value based on the imbalance data samples. The imbalance diagnostic module selectively diagnoses an AFIM in the cylinder bank based on the AFIM value.

In other features, the imbalance diagnostic module diagnoses the AFIM when the AFIM value is greater than a predetermined value.

In still other features, the first module applies a filter to the oxygen signal, and the imbalance data samples correspond to outputs of the filter.

In further features, the first module applies a Kalman filter to the oxygen signal.

In other features, the imbalance determination module determines the AFIM value based on a variance of the imbalance data samples.

In further features, the imbalance determination module determines the AFIM value based on an average of a square of each of the imbalance data samples from a mean of the imbalance data samples.

In still further features, the imbalance determination module determines the AFIM value based on the equation:

$$e(t_k) = \frac{1}{M}\sum_{i=1}^{M}\left(\Delta \bar{x}_i(t_k) - \frac{1}{M}\sum_{i=1}^{M}\Delta \bar{x}_i(t_k)\right)^2.$$

In other features, the first module outputs the imbalance data samples based on firing events of the cylinders.

In still other features, the first module outputs the imbalance data samples when each of the cylinders is fired and between when each of the cylinders is fired.

In further features, the AFIM system further comprises a cylinder identification module. The cylinder identification module attributes the AFIM to one of the cylinders when the AFIM is diagnosed.

An air/fuel imbalance (AFIM) diagnostic method comprises: outputting imbalance data samples based on an oxygen signal provided by an oxygen sensor measuring oxygen in exhaust expelled from cylinders of a cylinder bank; determining an AFIM value based on the imbalance data samples; and selectively diagnosing an AFIM in the cylinder bank based on the AFIM value.

In other features, the selectively diagnosing the AFIM comprises diagnosing the AFIM when the AFIM value is greater than a predetermined value.

In further features, the AFIM diagnostic method further comprises applying a filter to the oxygen signal, and the imbalance data samples correspond to outputs of the filter.

In still further features, the filter is a Kalman filter.

In other features, the determining the AFIM value comprises determining the AFIM value based on a variance of the imbalance data samples.

In further features, the determining the AFIM value comprises determining the AFIM value based on an average of a square of each of the imbalance data samples from a mean of the imbalance data samples.

In still further features, the determining the AFIM value comprises determining the AFIM value based on the equation:

$$e(t_k) = \frac{1}{M}\sum_{i=1}^{M}\left(\Delta \bar{x}_i(t_k) - \frac{1}{M}\sum_{i=1}^{M}\Delta \bar{x}_i(t_k)\right)^2.$$

In other features, the outputting comprises outputting the imbalance data samples based on firing events of the cylinders.

In still other features, the outputting comprises outputting the imbalance data samples when each of the cylinders is fired and between when each of the cylinders is fired.

In further features, the AFIM diagnostic method further comprises attributing the AFIM to one of the cylinders when the AFIM is diagnosed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
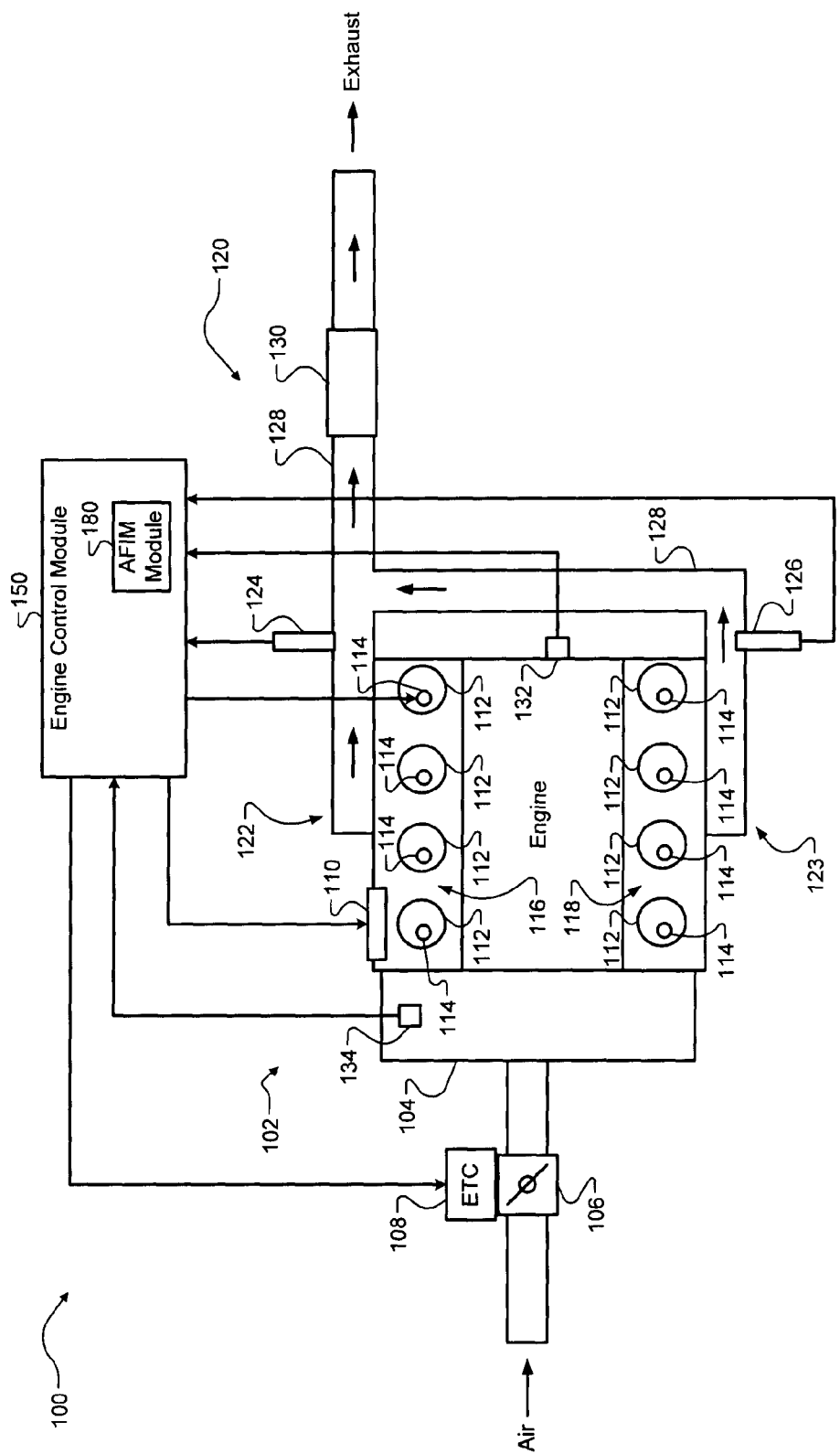
FIG. 1 is an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine combusts an air/fuel mixture within cylinders of the engine. Combustion of the air/fuel mixture produces exhaust gas that is expelled from the cylinders. An air/fuel imbalance (AFIM) in a cylinder bank of the engine may cause the exhaust gas expelled from the cylinder bank to have higher concentrations of some elements or compounds than exhaust produced when a stoichiometric air/fuel mixture is combusted.

An AFIM system according to the principles of the present disclosure determines an AFIM value for the cylinder bank and selectively diagnoses an AFIM in the cylinder bank based on the AFIM value. The AFIM system produces imbalance data samples based on oxygen in the exhaust gas expelled from the cylinder bank and determines the AFIM value based on the imbalance data samples. The AFIM system selectively diagnoses an AFIM in the cylinder bank based on a comparison of the AFIM value and a predetermined value. For example only, the AFIM system selectively diagnoses an AFIM in the cylinder bank when the AFIM value is greater than a predetermined value.

Referring now to FIG. 1, a functional block diagram of an exemplary implementation of an engine system 100 is presented. Air is drawn into an engine 102 through an intake manifold 104 and a throttle valve 106. The throttle valve 106 is actuated to control airflow into the engine 102. An electronic throttle controller (ETC) 108 controls the throttle valve 106 and, therefore, airflow into the engine 102.

A fuel system 110 injects fuel that mixes with the air to form the air/fuel mixture. The fuel system 110 may inject the fuel at any suitable location. For example only, the fuel system 110 may provide fuel into the intake manifold 104, into intake valves (not shown) associated with cylinders 112 of the engine 102, and/or directly into each of the cylinders 112. In various implementations, the fuel system 110 includes one fuel injector (not shown) for each of the cylinders 112.

The air/fuel mixture is combusted within the cylinders 112 of the engine 102. Combustion of the air/fuel mixture may be initiated in any suitable manner. For example only, combustion may be initiated by spark provided by spark plugs 114. In various implementations, one spark plug may be provided for each of the cylinders 112. Combustion of the air/fuel mixture generates drive torque and rotatably drives a crankshaft (not shown).

Figure 2:
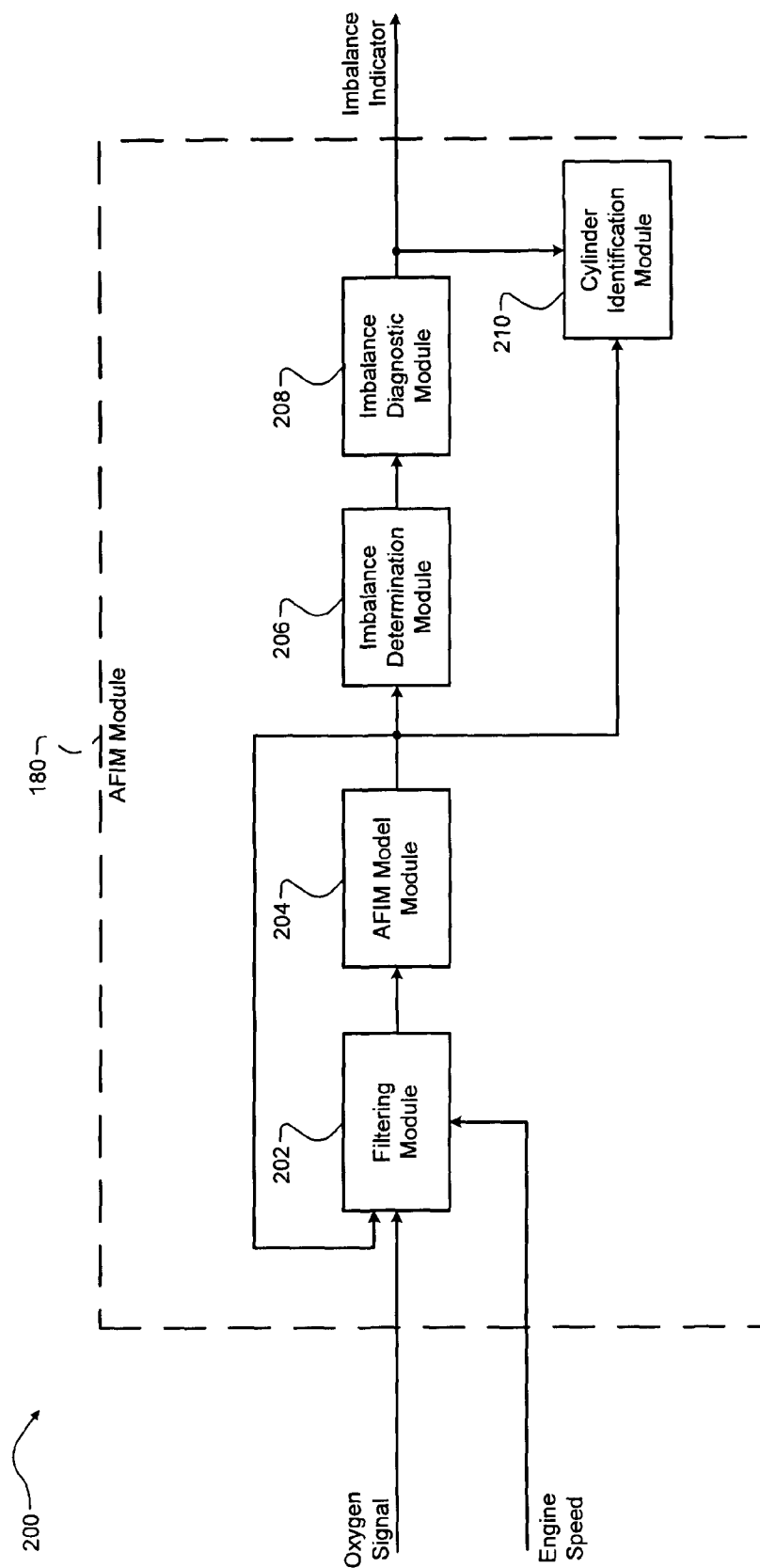
FIG. 2 is a functional block diagram of an exemplary implementation of an air/fuel imbalance (AFIM) system according to the principles of the present disclosure.

The engine 102 may be configured in any suitable configuration. For example only, the engine 102 may be configured in a V-type configuration or an inline-type configuration. The engine 102 may include eight cylinders as shown in FIG. 2, although the engine 102 may include a greater or fewer number of cylinders.

The cylinders 112 of the engine 102 are depicted as being arranged in two cylinder banks: a right cylinder bank 116 and a left cylinder bank 118. Although the engine 102 is shown as including the right and left cylinder banks 116 and 118, the engine 102 may include fewer or more cylinder banks. For example only, inline-type engines may be considered to have cylinders arranged in one cylinder bank.

Exhaust gas resulting from combustion of the air/fuel mixture is expelled from the engine 102 to an exhaust system 120. Specifically, exhaust expelled from each of the cylinders 112 of the right cylinder bank 116 converges at a right confluence point 122. Similarly, exhaust gas expelled from each of the cylinders 112 of the left cylinder bank 118 converges at a left confluence point 123. The exhaust gas that is expelled from each of the cylinders 112 is referred to as an exhaust gas packet.

The right and left cylinder banks 116 and 118 each have an associated oxygen sensor that measures oxygen concentration of the exhaust gas produced by the cylinders 112 of that cylinder bank. For example only, an oxygen sensor 124 is associated with the right cylinder bank 116 and an oxygen sensor 126 is associated with the left cylinder bank 118. The oxygen sensors 124 and 126 output signals corresponding to oxygen in the exhaust produced by the cylinders 112 of the right and left cylinder banks 116 and 118, respectively.

The oxygen sensor 124 may be located at any suitable location, such as at or downstream of the right confluence point 122. The oxygen sensor 126 may also be located at any suitable location, such as at or downstream of the left confluence point 123. The oxygen sensors 124 and 126 may be any suitable type of oxygen sensor, such as wide-band type oxygen sensors, switching-type oxygen sensors, or conical-type oxygen sensors. The signals output by the oxygen sensors 124 and 126 may be any suitable type of signal, such as analog, voltage signals.

The exhaust gas flows past the oxygen sensors 124 and 126 and the exhaust may be brought together by a system of exhaust pipes 128, which carry the exhaust to a catalyst 130. The catalyst 130 selectively reacts with various components of the exhaust before the exhaust is expelled from the exhaust system 120. The oxygen sensors 124 and 126 are located upstream of the catalyst 130.

An engine control module (ECM) 150 controls the torque output of the engine 102. For example only, the ECM 150 may control the torque output of the engine 102 based on driver inputs, such as inputs made via an accelerator pedal (not shown).

The ECM 150 also controls the air/fuel mixture. More specifically, the ECM 150 controls the respective components of the air/fuel mixture that is provided to each of the cylinders 112. The ECM 150 controls airflow into the engine 102 via the throttle valve 106 and the amount of fuel injected via the fuel system 110. For example only, the ECM 150 may control the air/fuel mixture to achieve a stoichiometric air/fuel mixture (e.g., 14.7:1).

The ECM 150 receives the signals output by the oxygen sensors 124 and 126, which will be hereafter referred to as oxygen signals. The ECM 150 also receives an engine speed signal from an engine speed sensor 132 and a manifold absolute pressure (MAP) signal from a MAP sensor 134. The ECM 150 may also receive signals from other sensors, such as an engine coolant temperature (ECT) sensor, an oil temperature sensor, a mass airflow (MAF) sensor, an intake air temperature (IAT) sensor and/or any other suitable sensor.

The engine speed sensor 132 may include any suitable type of engine speed sensor, such as a variable reluctance (VR) sensor. The engine speed signal may include a pulse train. Each pulse of the pulse train may be generated as a tooth of an N-toothed wheel (not shown) attached to the crankshaft passes the VR sensor. Accordingly, each pulse may correspond to an angular rotation of the crankshaft by an amount equal to 360° divided by N teeth (i.e., 360°/N). The N-toothed wheel may also include a gap of one or more missing teeth, which may be used to indicate one revolution of the crankshaft and/or the completion of an engine cycle.

The ECM 150 includes an air/fuel imbalance (AFIM) module 180 that selectively diagnoses an AFIM in one of the cylinder banks 116 and 118. While the AFIM module 180 is shown and is discussed as being located within the ECM 150, the AFIM module 180 may be located in any suitable location, such as externally to the ECM 150 and/or within any other suitable module or system.

The AFIM module 180 will be discussed as it relates to diagnosing an AFIM in a cylinder bank based on oxygen in exhaust gas expelled from cylinders of that cylinder bank. For example only, the AFIM module 180 may selectively diagnose an AFIM in the right cylinder bank 116 based on the oxygen signal output by the oxygen sensor 124. In other implementations, the AFIM module 180 may diagnose an AFIM in the left cylinder bank 118 based on the oxygen signal output by the oxygen sensor 126.

Referring now to FIG. 2, a functional block diagram of an exemplary implementation of an AFIM system 200 is presented. The AFIM module 180 includes a filtering module 202, an AFIM model module 204, an imbalance determination module 206, and an imbalance diagnostic module 208. The filtering module 202 samples the oxygen signal, applies a filter to the oxygen signal, and outputs an imbalance data sample (i.e., $\Delta \hat{x}$) when the oxygen signal is sampled. The filtering and imbalance data samples are discussed in detail below.

The filtering module 202 receives the oxygen signal and samples the oxygen signal based on the engine speed signal. More specifically, the filtering module 202 samples the oxygen signal based on the firing events of the cylinders 112 of the cylinder bank with which the oxygen signal is associated. For example only, when the filtering module 202 receives the oxygen signal from the oxygen sensor 124, the filtering module 202 may sample the oxygen signal based on the firing events of the cylinders 112 of the right cylinder bank 116. The filtering module 202 may sample the oxygen signal based on the firing events of the cylinders 112 of the left cylinder bank 118 when the filtering module 202 receives the oxygen signal from the oxygen sensor 126. The filtering module 202 may also sample the oxygen signal between the firing events of each of the cylinders 112 of the associated cylinder bank.

The sampling rate (i.e., k) of the filtering module 202 may be calibratable and may be set based upon the order in which the cylinders 112 of the engine 102 are fired (i.e., the firing order). For example only, the filtering module 202 may be set to sample the oxygen signal when each firing event occurs in engines having a firing order that is evenly distributed across the cylinder banks 116 and 118. The filtering module 202 may additionally sample the oxygen signal between firing events for engines having an uneven firing order or a single cylinder bank. A given firing order may be referred to as an uneven firing order when two or more cylinders of one cylinder bank are fired consecutively before a cylinder of another cylinder bank is fired.

For example only, the cylinders 112 of the engine 102 may be fired according to the exemplary firing order (FO):

FO=1, 8, 7, 2, 6, 5, 4, 3, where the odd numbered cylinders (e.g., 1, 3, 5, and 7) correspond to the cylinders 112 of the left cylinder bank 118 and the even numbered cylinders (e.g., 2, 4, 6, and 8) correspond to the cylinders 112 of the right cylinder bank 116. The exemplary firing order above may be referred to as an uneven firing order because two of the cylinders 112 of the left cylinder bank 118 are fired consecutively (i.e., cylinder 3 then cylinder 1) and two of the cylinders 112 of the right cylinder bank 116 are fired consecutively (i.e., cylinder 2 then cylinder 6).

The filtering module 202 outputs the imbalance data samples to the AFIM model module 204. The AFIM model module 204 stores a predetermined number of the imbalance data samples in an AFIM model. Accordingly, the AFIM model includes a predetermined number of the imbalance data samples for the cylinders 112 of the associated cylinder bank. The AFIM model module 204 may also include a similar AFIM model for the cylinders 112 of any other cylinder bank.

The predetermined number of imbalance data samples of the AFIM model may be set based on the number of cylinders of the associated cylinder bank (i.e., N) and the sampling rate of the filtering module 202. For example only, the predetermined number of samples may be 2*k*N samples, where k corresponds to the sampling rate of the oxygen signal (e.g., once or twice per firing event) and N is the number of the cylinders 112 of the associated cylinder bank. In other words, the AFIM model includes imbalance data samples for two engine cycles.

The AFIM model module 204 acts as a first in, first out (FIFO) buffer. More specifically, the AFIM model module 204 updates the AFIM model when each imbalance data sample is received from the filtering module 202 and removes an oldest imbalance data sample from the AFIM model. For example only, the AFIM model may be expressed as:

$$\Delta \hat{x}(t_k) = [\Delta \hat{x}_1(t_k) \ldots \Delta \hat{x}_{2kN}(t_k)],$$

where $\Delta \hat{x}_i(t_k)$ is an i-th imbalance data sample of the AFIM model and $1 \leq i \leq 2kN$.

As the AFIM model module 204 acts as a FIFO buffer, the most recently received imbalance data samples are located first (i.e., leftmost) in the AFIM model. In other words, $\Delta \hat{x}_1(t_k)$ corresponds to a most recent imbalance data sample, and $\Delta \hat{x}_{2kN}(t_k)$ corresponds to the oldest imbalance data sample. The AFIM model module 204 may reverse the order of the imbalance data samples of the AFIM model, and the AFIM model may be expressed as:

$$\Delta \bar{x}(t_k) = [\Delta \bar{x}_1(t_k) \ldots \Delta \bar{x}_{2kN}(t_k)],$$

where $$[\Delta \bar{x}_1(t_k) \ldots \Delta \bar{x}_{2kN}(t_k)] = [\Delta \bar{x}_{2kN}(t_k) \ldots \Delta \bar{x}_1(t_k)].$$

Referring back to the filtering module 202, the filter applied by the filtering module 202 and a resulting imbalance data sample may be expressed as:

$$\Delta \hat{x}(t_k) = \Delta \hat{x}(t_k | t_{k-1}) + K(\Delta U_s(t_k) - \Delta \hat{U}_s(t_k | t_{k-1})) \quad (1)$$

where $\Delta \hat{x}(t_k)$ is an imbalance data sample at sampling time k, $\Delta \hat{x}(t_k | t_{k-1})$ is a prior estimate of the imbalance data sample at sampling time k (i.e., an estimated imbalance data sample), K is a filter gain, $\Delta U_s(t_k)$ is oxygen signal data at sampling time k, and $\Delta \hat{U}_s(t_k | t_{k-1})$ is a prior estimate of the oxygen signal data at sampling time k (i.e., estimated oxygen signal data). In other words, the filtering module 202 applies a Kalman filter to the oxygen signal and the imbalance data sample is a result of the Kalman filtering of the oxygen signal.

Figure 3:
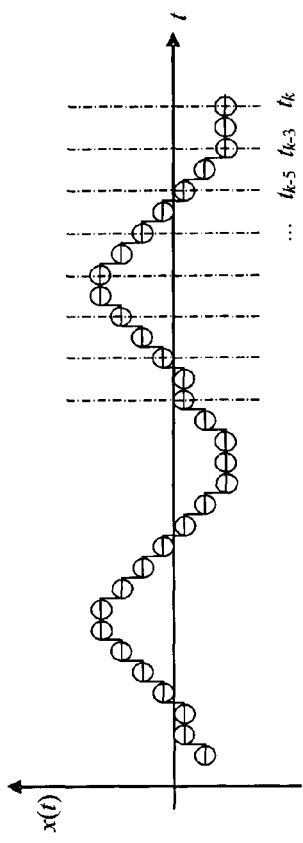
FIG. 3 is a graph showing air/fuel imbalance data samples as a function of time according to the principles of the present disclosure.

The estimated imbalance data sample is determined based on imbalance data samples collected up to and including a previous sampling time k–1. Similarly, the estimated oxygen signal data is determined based on oxygen signal data collected up to and including the previous sampling time k–1. An exemplary graph of imbalance data samples as a function of time is presented in FIG. 3.

The estimated imbalance data may be determined using the equation:

$$\Delta \hat{x}(t_k | t_{k-1}) = A \Delta \hat{x}(t_{k-1}), \quad (2)$$

where A is a matrix having elements that reflect the cyclical nature of imbalance data samples over an engine cycle and $\Delta \hat{x}(t_{k-1})$ is the imbalance data sample at the previous sampling time k–1. The imbalance data at the previous sampling time may be retrieved from, for example, the AFIM model of the AFIM model module 204. Imbalance data samples at sampling time zero (i.e., $\Delta \hat{x}(t_0)$) may be set to zero, assuming that the initial cylinder imbalances with respect to the nominal mixture ratio is zero. For example only, the imbalance data samples at sampling time zero may be expressed as:

$$\Delta \hat{x}(t_0) = [0 \ldots 0] \epsilon R^{2kN},$$

and the matrix A may be represented as:

$$A = \begin{bmatrix} 0 & \ldots & \ldots & 0 & 1 \\ 1 & \ddots & & & 0 \\ 0 & \ddots & \ddots & & \vdots \\ \vdots & \ddots & \ddots & \ddots & \vdots \\ 0 & \ldots & 0 & 1 & 0 \end{bmatrix}.$$

The filter gain (i.e., K of equation (1)) may be determined, for example, using the steady-state limit of the recursive equations:

$$P(t_k | t_{k-1}) = AP(t_{k-1})A^T + Q \quad P(t_0) = \text{diag}[\, p_1 \ \ldots \ p_{2kN} \,] \quad (3)$$

$$P(t_k) = [I - P(t_k | t_{k-1})C^T [CP(t_k | t_{k-1})C^T + R]^{-1} C] P(t_k | t_{k-1}),$$

$$K = \lim_{k \to \infty} [P(t_k | t_{k-1})C^T [CP(t_k | t_{k-1})C^T + R]^{-1}]$$

where Q and R are calibratable filter parameters selected to optimize the estimates of the imbalance data and oxygen signal data. For example only, $Q = Q^T \geq 0 \in R^{2kN \times 2kN}$ and $R > 0$.

The oxygen signal data at sampling time k (i.e., $\Delta U_s(t_k)$ of equation (1)) may be determined, for example, using the equation:

$$\Delta U_s(t_k) = U_s(t_k) - \bar{U}_s(t_k), \quad (4)$$

where $U_s(t_k)$ is the oxygen signal at sampling time k and $\bar{U}_s(t_k)$ is a reference oxygen signal at sampling time k. For example only, the reference oxygen signal may be determined based on an average of a predetermined number of oxygen signal samples centered at sampling time k and may be determined using the equation:

$$\bar{U}_s(t_k) = \frac{1}{M} \sum U_s(t_i), \quad (5)$$

where M=2kN, N corresponds to the number of the cylinders 112 of the associated cylinder bank, and $1 \leq i \leq 2kN$. The predetermined number of oxygen signal samples may be taken based on the oxygen signals sampled over the range from $$k - \frac{M}{2} + 1 \text{ to } k + \frac{M}{2}.$$

Figure 4:
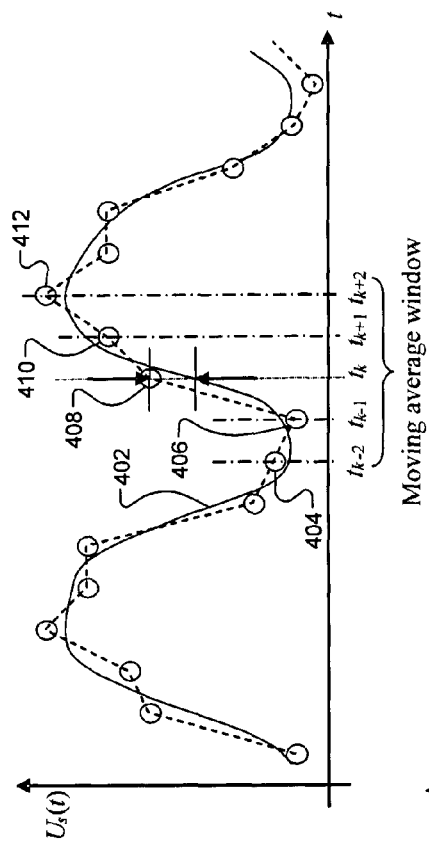
FIG. 4 is a graph showing oxygen signal as a function of time according to the principles of the present disclosure.

Referring now to FIG. 4, an exemplary graph showing oxygen signal (i.e., $U_s(t)$) as a function of time is presented. Trace 402 corresponds to the reference oxygen signal (i.e., $\bar{U}_s(t_k)$). The reference oxygen signal may be determined using equation (5) as described above. Oxygen signal samples 404, 406, 408, 410, and 412 correspond to the oxygen signal sampled at sampling times k–2, k–1, k, k+1, and k+2, respectively. As described in equation (4) above, the oxygen signal data (i.e., $\Delta U_s(t_k)$) at sampling time k may be determined based on the oxygen signal at sampling time k less the reference oxygen signal at sampling time k.

Referring back to FIG. 2 and the filtering module 202, the estimated oxygen signal data at sampling time k (i.e., $\Delta \hat{U}_s(t_k | t_{k-1})$ of equation (1)) may be expressed as:

$$\Delta \hat{U}_s(t_k | t_{k-1}) = C \Delta \hat{x}(t_k | t_{k-1}), \quad (6)$$

where C is a matrix having elements that reflect the respective contributions of the exhaust gas packets of each of the cylinders 112 of the associated cylinder bank to the oxygen signal and $\Delta \hat{x}(t_k | t_{k-1})$ is the estimated imbalance data sample at sampling time k as described in equation (2) above.

Due to the location of the oxygen sensor 124, the oxygen signal reflects exhaust gas produced by each of the cylinders 112 of the right cylinder bank 116. In other words, the concentration of oxygen measured by the oxygen sensor 124 is not attributable to any of the cylinders 112 of the right cylinder bank 116 independently. Instead, the oxygen concentration is attributable to a combination of all of the cylinders 112 of the right cylinder bank 116 due to mixing of the exhaust gas upstream or at the location of the oxygen sensor 124. The firing order and/or the period of time between the firing events of the cylinders 112 of the right cylinder bank 116 may also affect the contributions that each of the cylinders 112 have to the oxygen signal. The same characteristics are also applicable to the relationship between the oxygen sensor 126 and the left cylinder bank 118.

The elements of the matrix C reflect the relative contributions of each of the cylinders 112 of the associated cylinder bank, the elements may be calibratable, and matrix C may be expressed as:

$$C=[c_1 \ldots c_N],$$

where $c_1$ corresponds to the contribution of the exhaust gas packet of a cylinder of the associated cylinder bank that was most recently fired and $c_N$ corresponds to the contribution of the exhaust gas packet of a cylinder of the associated cylinder bank that was fired the longest period ago.

The imbalance determination module 206 determines an AFIM value for the associated cylinder bank when the oxygen signal is sampled. More specifically, the imbalance determination module 206 determines the AFIM value based on a variance of the imbalance data samples of the AFIM model. For example only, the imbalance determination module 206 may determine the AFIM value based on an average of a square of each of the imbalance data samples from a mean of the imbalance data samples. Mathematically, the imbalance determination module 206 may determine the AFIM value at sampling time k using the equation:

$$e(t_k) = \frac{1}{M} \sum_{i=1}^{M} \left( \Delta \overline{x}_i(t_k) - \frac{1}{M} \sum_{i=1}^{M} \Delta \overline{x}_i(t_k) \right)^2, \quad (7)$$

where $e(t_k)$ is the AFIM value at sampling time k and M=2kN. The AFIM value reflects the relative air/fuel imbalance that exists across the cylinders 112 of the associated cylinder bank at sampling time k. For example only, a greater AFIM exists as the AFIM value increases.

The imbalance diagnostic module 208 selectively diagnoses an AFIM in the associated cylinder bank based on the AFIM value. More specifically, the imbalance diagnostic module 208 selectively diagnoses an AFIM in the associated cylinder bank based on a comparison of the AFIM value with a predetermined value. For example only, the imbalance diagnostic module 208 may diagnose an AFIM when the AFIM value is greater than the predetermined value.

The predetermined value may be calibratable and may be set based on, for example, various engine parameters, the filter gain K, the filter parameters Q and R, and/or any other suitable parameters. The predetermined value may also be set based on concentrations of various components of exhaust gas (e.g., NOx and/or carbon oxides) that are produced when various air/fuel mixtures are combusted.

The imbalance diagnostic module 208 generates or sets an imbalance indicator when an AFIM is diagnosed. For example only, the imbalance diagnostic module 208 may set an AFIM flag in a diagnostic memory (not shown), generate a signal, illuminate a light (e.g., a "check engine" light), and/or generate any other suitable indicator of an AFIM.

Figure 5:
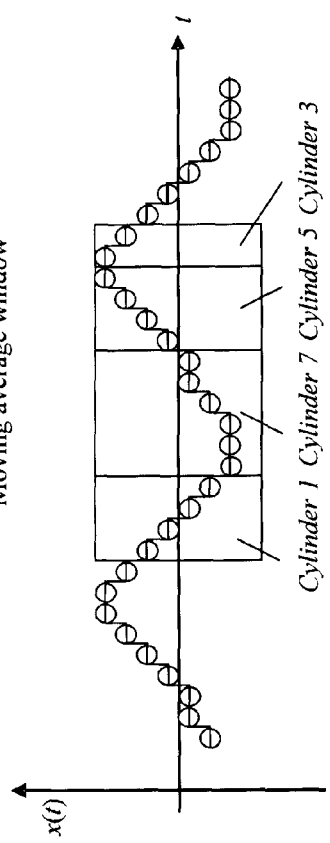
FIG. 5 is a graph showing cylinder numbers corresponding to the imbalance data samples according to the principles of the present disclosure.

The AFIM module 180 may also include a cylinder identification module 210. The cylinder identification module 210 receives the imbalance indicator when an AFIM is diagnosed and identifies the cylinder of the associated cylinder bank to which the indicated AFIM is attributable. The cylinder identification module 210 may also identify the imbalance data samples that correspond to each of the cylinders 112 of the associated cylinder bank. An exemplary illustration of exemplary cylinder numbers corresponding to the imbalance data samples and the firing order above is presented in FIG. 5.

The cylinder identification module 210 may identify the cylinders 112 of the associated cylinder bank in any suitable manner, such as by probing, one or more look-up tables, and/or trial and error. For example only, the cylinder identification module 210 may probe the cylinders 112 of the associated cylinder bank by selecting one of the cylinders 112 and controlling the air/fuel mixture that is supplied to that cylinder. More specifically, the cylinder identification module 210 may command a rich air/fuel mixture be supplied to the selected cylinder during a first engine cycle and a lean air/fuel mixture be supplied during a second engine cycle.

The cylinder identification module 210 may select the cylinder to be probed based on the cylinder that fires at the beginning of the shortest sampling period between the firing events of the associated cylinder bank. For example only, based on the firing order above, the cylinder identification module 210 may select the third cylinder when an AFIM is diagnosed in the left cylinder bank 118. The third cylinder fires immediately before the first cylinder in the firing order and, therefore, fires at the beginning of the shortest sampling period between firing events of the left cylinder bank 118. For similar reasons, the cylinder identification module 210 may select the second cylinder when an AFIM is diagnosed in the right cylinder bank 116.

Once the rich and lean air/fuel mixtures have been supplied during the two consecutive engine cycles, the cylinder identification module 210 identifies the imbalance data samples of the AFIM model that correspond to the selected cylinder. For example only, the imbalance data samples corresponding to the selected cylinder may be the imbalance data samples having the largest difference over the two engine cycles. Based on the firing order, the cylinder identification module 210 may then associate the cylinders (i.e., the cylinder numbers) with the remainder of the imbalance data samples of the AFIM model.

The cylinder identification module 210 may also identify the cylinder of the associated cylinder bank to which the indicated AFIM is attributable based on one or more lookup tables. For example only, the cylinder identification module 210 may identify the cylinder that experienced the AFIM based on engine load and/or engine speed at the sampling time of the AFIM. The engine load may be determined based on the MAP signal, engine vacuum, and/or any other suitable engine parameter(s).

The cylinder identification module 210 may also conduct trial and error to identify which cylinder experienced or is experiencing the indicated AFIM. More specifically, the cylinder identification module 210 may select one of the cylinders 112 of the associated cylinder bank and adjust the air/fuel mixture supplied to that cylinder.

Once adjusted, the cylinder identification module 210 may monitor the resulting AFIM values over a period of time and may identify that cylinder as the cylinder to which the AFIM is attributable when the AFIM value changes as expected. The cylinder identification module 210 may repeat this process for each of the cylinders 112 of the associated cylinder bank to identify the affected cylinder. In various implementations, the cylinder identification module 210 may implement probing, lookup tables, and/or trial and error.

Figure 6:
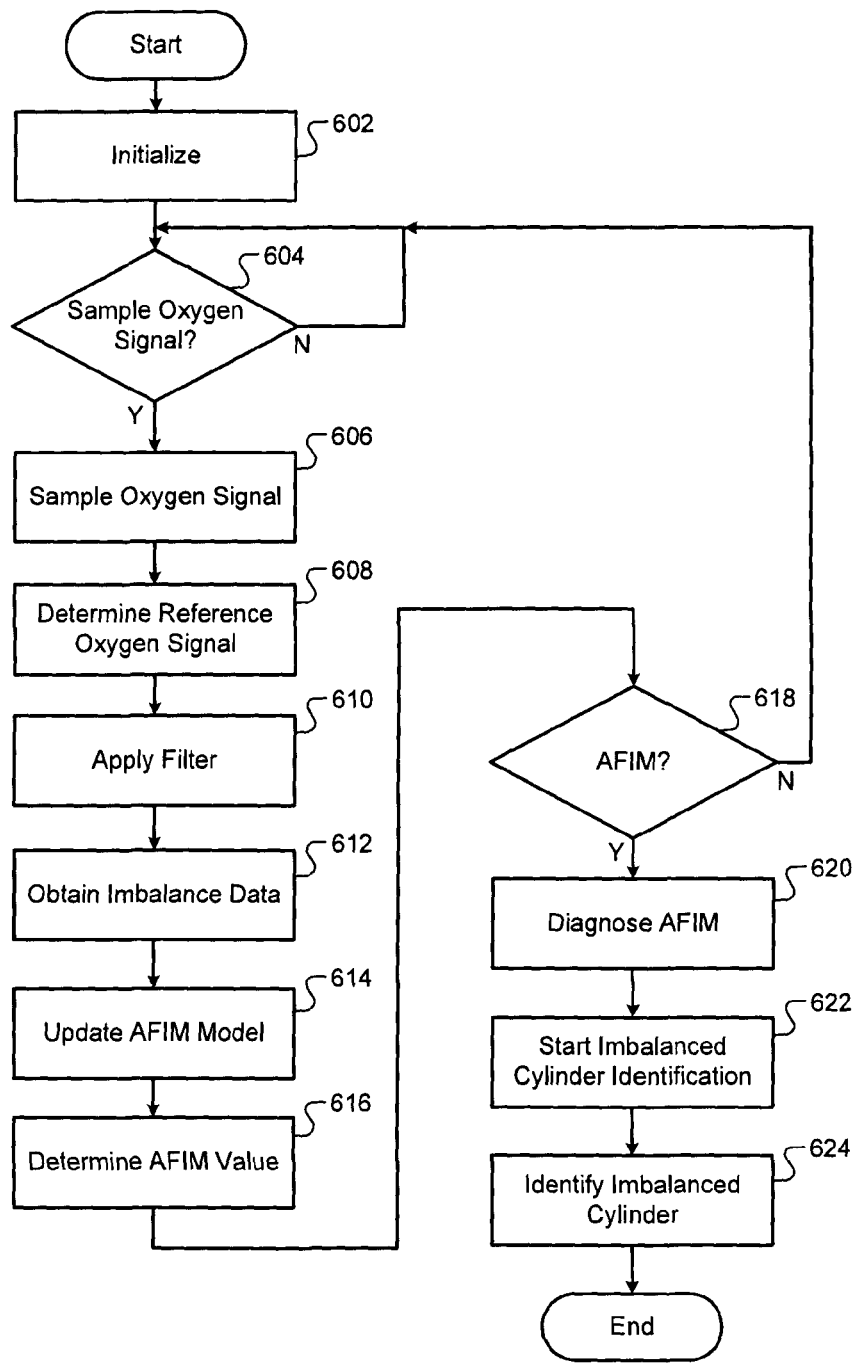
FIG. 6 is a flowchart depicting exemplary steps performed by the AFIM system according to the principles of the present disclosure.

Referring now to FIG. 6, a flowchart depicting exemplary steps performed by the AFIM module 180 is presented. Control begins in step 602 where control initializes the AFIM system 200. For example only, control may initialize the AFIM model, such as by resetting the AFIM model to zero. In step 604, control determines whether to sample the oxygen signal. If true, control proceeds to step 606. If false, control remains in step 604.

Control determines whether to sample the oxygen signal based on the engine speed signal provided by the engine speed sensor 132. For example only, control may determine to sample the oxygen signal when each cylinder of the associated cylinder bank fires and/or between each of the firing events.

Control samples the oxygen signal in step 606 and determines the reference oxygen signal in step 608. Control may determine the reference oxygen signal using equation (5) as described above. In step 610, control applies a filter to the oxygen signal. For example only, control may apply a Kalman filter to the oxygen signal.

Control obtains the imbalance data sample in step 612. For example only, the imbalance data sample may be determined using equation (1) as described above. In step 614, control updates the AFIM model based on the imbalance data sample. In other words, control removes the oldest imbalance data sample from the AFIM model and stores the imbalance data sample obtained in step 612. In this manner, the AFIM model includes a predetermined number of the most recent imbalance data samples.

In step 616, control determines the AFIM value. Control may determine the AFIM value using equation (7) above. Control determines whether to diagnose an AFIM in the associated cylinder bank in step 618. If true, control proceeds to step 620. If false, control returns to step 604. Control determines whether to diagnose an AFIM based on a comparison of the AFIM value with the predetermined value. For example only, control may diagnose the AFIM in the associated cylinder bank when the AFIM value is greater than the predetermined value. Control diagnoses an AFIM in the associated cylinder bank in step 620. For example only, control may generate an AFIM signal, set a diagnostic flag in memory, light a light (e.g., a "check engine" light) and/or generate any other AFIM indicator when the AFIM is diagnosed.

Control starts cylinder identification in step 622 and identifies the imbalanced cylinder in step 624. Control may identify the cylinder to which the diagnosed AFIM is attributable in any suitable manner. For example, control may identify the imbalanced cylinder by probing, one or more lookup tables, and/or trial and error. Control may also identify the other cylinders 112 of the associated cylinder bank with the respective imbalance data samples in steps 622 and 624. Control then ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An air/fuel imbalance diagnostic system comprising:
a filtering module that receives an oxygen signal from an oxygen sensor, that selectively samples the oxygen signal, and that generates imbalance data samples using:
a Kalman filter;
estimates of the imbalance data samples generated based on a first matrix having elements that reflect a cyclical nature of imbalance data samples of an engine cycle;
oxygen signal data generated based on samples of the oxygen signal and samples of a reference oxygen signal determined based on an average of a predetermined number of oxygen signal samples; and
estimates of the oxygen signal data generated based on a second matrix having elements that reflect respective contributions of cylinders of a cylinder bank to the oxygen signal;
wherein the oxygen sensor measures oxygen in the exhaust from the cylinders of the cylinder bank;
an imbalance determination module that determines one air/fuel imbalance (AFIM) value for the entire cylinder bank based on a variance of a plurality of the imbalance data samples;
an imbalance diagnostic module that selectively indicates that an AFIM is present in the cylinder bank based on the AFIM value; and
a cylinder identification module that, in response to the imbalance diagnostic module indicating that the AFIM is present in the cylinder bank, attributes the AFIM to one of the cylinders of the cylinder bank.

2. The AFIM system of claim 1 wherein the imbalance diagnostic module indicates that the AFIM is present in the cylinder bank when the AFIM value is greater than a predetermined value.

3. The AFIM system of claim 1 wherein the imbalance determination module determines the AFIM value based on an average of a square of each of the imbalance data samples from a mean of the imbalance data samples.

4. The AFIM system of claim 1 wherein the imbalance determination module determines the AFIM value based on the equation:

$$e(t_k) = \frac{1}{M}\sum_{i=1}^{M}\left(\Delta\bar{x}_i(t_k) - \frac{1}{M}\sum_{i=1}^{M}\Delta\bar{x}_i(t_k)\right)^2.$$

5. The AFIM system of claim 1 wherein the filtering module generates the imbalance data samples based on firing events of the cylinders.

6. The AFIM system of claim 1 wherein the filtering module outputs the imbalance data samples when each of the cylinders is fired and between when each of the cylinders is fired.

7. The AFIM system of claim 1 wherein the cylinder identification module commands a rich air/fuel mixture be supplied to a second one of the cylinders of the cylinder bank during a first engine cycle after the AFIM is indicated, that commands a lean air/fuel mixture be supplied to the second one of the cylinders during a second engine cycle after the AFIM is indicated, and that attributes the AFIM to the one of the cylinders of the cylinder bank based on imbalance data samples generated based on the first and second engine cycles.

8. An air/fuel imbalance (AFIM) diagnostic method comprising:
receiving an oxygen signal from an oxygen sensor, wherein the oxygen sensor measures oxygen in exhaust from cylinders of a cylinder bank;
selectively sampling the oxygen signal;
generating imbalance data samples using:
a Kalman filter;
estimates of the imbalance data samples generated based on a first matrix having elements that reflect a cyclical nature of imbalance data samples of an engine cycle;

oxygen signal data generated based on samples of the oxygen signal and samples of a reference oxygen signal determined based on an average of a predetermined number of oxygen signal samples; and estimates of the oxygen signal data generated based on a second matrix having elements that reflect respective contributions of cylinders of a cylinder bank to the oxygen signal;

determining one air/fuel imbalance (AFIM) value for the entire cylinder bank based on a variance of a plurality of the imbalance data samples;

selectively indicating that an AFIM is present in the cylinder bank based on the AFIM value; and attributing the AFIM to one of the cylinders of the cylinder bank in response to the indicating that the AFIM is present in the cylinder bank.

9. The AFIM diagnostic method of claim 8 further comprising indicating that the AFIM is present in the cylinder bank when the AFIM value is greater than a predetermined value.

10. The AFIM diagnostic method of claim 8 further comprising determining the AFIM value based on an average of a square of each of the imbalance data samples from a mean of the imbalance data samples.

11. The AFIM diagnostic method of claim 8 further comprising determining the AFIM value based on the equation:

$$e(t_k) = \frac{1}{M} \sum_{i=1}^{M} \left( \Delta \bar{x}_i(t_k) - \frac{1}{M} \sum_{i=1}^{M} \Delta \bar{x}_i(t_k) \right)^2.$$

12. The AFIM diagnostic method of claim 8 further comprising generating the imbalance data samples based on firing events of the cylinders.

13. The AFIM diagnostic method of claim 8 further comprising generating the imbalance data samples when each of the cylinders is fired and between when each of the cylinders is fired.

14. The AFIM diagnostic method of claim 8 further comprising:

commanding a rich air/fuel mixture be supplied to a second one of the cylinders of the cylinder bank during a first engine cycle after the AFIM is indicated;

commanding a lean air/fuel mixture be supplied to the second one of the cylinders during a second engine cycle after the AFIM is indicated; and attributing the AFIM to the one of the cylinders of the cylinder bank based on imbalance data samples generated based on the first and second engine cycles.

* * * * *